United States Patent [19]

Anders et al.

[11] Patent Number: 4,710,098

[45] Date of Patent: Dec. 1, 1987

[54] VALVE AND BLOWER APPARATUS FOR PNEUMATIC TUBE SYSTEM

[75] Inventors: Walter G. Anders, North Canton; Leo J. Grosswiller, Jr., East Canton; Benjamin F. Lozier; Alan J. Rozlosnik, both of Louisville, all of Ohio

[73] Assignee: Diebold, Incorporated, Canton, Ohio

[21] Appl. No.: 802,796

[22] Filed: Nov. 27, 1985

[51] Int. Cl.$^4$ .................. B65G 51/08; F04D 29/40
[52] U.S. Cl. ............................... 415/149 A; 415/150; 406/112; 137/870
[58] Field of Search ............... 415/148, 148 R, 149 A, 415/150, 159, 160; 137/565, 883, 870; 406/109, 110, 111, 112

[56] References Cited

U.S. PATENT DOCUMENTS

| | | | |
|---|---|---|---|
| 347,227 | 8/1886 | Campbell | 415/149 R X |
| 3,734,133 | 5/1973 | Little et al. | 137/870 X |
| 4,184,792 | 1/1980 | Turnbo | 406/110 X |
| 4,189,260 | 2/1980 | Morano | 406/112 X |
| 4,189,261 | 2/1980 | Kelly et al. | 406/112 |
| 4,325,660 | 4/1982 | Jones | 406/112 X |
| 4,331,295 | 5/1982 | Warihashi | 415/152 R X |

Primary Examiner—Robert E. Garrett
Assistant Examiner—Joseph M. Pitko
Attorney, Agent, or Firm—D. Peter Hochberg

[57] ABSTRACT

A blower and valve apparatus for a pneumatic tube system is enclosed in a divided housing (10). A conventional blower fan (36) operates to create pressure in a pressure area P and suction in a suction area S of the housing. Area P has two air passage outlets; a first pressure outlet (38) to atmosphere and a second pressure outlet (40) to a neutral area C. Area S likewise has two air passage outlets; a first suction outlet (44) to atmosphere and a second suction outlet 42 to neutral area C. Area C is connected through a coupling (23) to the end of a pneumatic tube. A first rotatable flapper vane (50) is mounted in area P. At one extreme of its arcuate movement, the rotatable flapper vane closes the first pressure outlet to atmosphere and at the other extreme closes the second pressure outlet to area C. A second rotatable flapper vane (54) is mounted in area S. At one extreme of its arcuate movement the second flapper vane (54) closes the first suction outlet to atmosphere and at the other extreme closes the second suction outlet to area C. The rotatable flapper vanes are rotated together by a control linkage (63). The control linkage is arranged so that in a first position the vane in area S closes the outlet to atmosphere and opens the outlet to area C while the vane in area P closes the outlet to area C (40) leaving the outlet to atmosphere in area P open.

55 Claims, 12 Drawing Figures

VALVE AND BLOWER APPARATUS FOR PNEUMATIC TUBE SYSTEM

TECHNICAL FIELD

This invention relates to pneumatic tube systems which transport materials and carriers from one station to another using air pressure. Specifically, this invention relates to valve and blower apparatus used to create and control the air pressure which moves the carriers in such tubes.

BACKGROUND ART

Pneumatic tube systems are well-known in the prior art. Pneumatic tube systems generally consist of a single tube which runs between two (2) stations. A carrier is transported between the stations by alternatively applying air pressure or suction to the end of the tube at one of the stations. Pneumatic tube systems are most often used in drive-in banking and toll collection systems. Examples of pneumatic tube systems are shown in U.S. Pat. Nos. 3,695,809; 3,599,898; 2,912,066; 4,135,684; and 4,189,261.

Most pneumatic tube systems employ a single blower or fan located at the first of the two stations. Such blowers typically have a single inlet or suction port and a single outlet or pressure port. The blowers are generally connected to one end of the tube through a series of valves. The other end of the tube which is at the second station of the system is open to atmosphere at all times.

When it is desired to transport the carrier from the first station where the blower is located to the second station of the system, the valves are operated so that the pressure port of the blower is connected to the tube behind the carrier and the inlet port of the blower is opened to atmosphere. This causes the air pressure to rise in the tube behind the carrier, pushing it toward the second station. The carrier is able to move because the air in the tube ahead of the carrier is able to exhaust at the second station. When it is desired to move the carrier from the second station back to the first station where the blower is located, the valves are repositioned so that the suction port of the blower is connected to the end of the tube at the first station and the pressure side of the blower is opened to atmosphere. The suction action on the carrier pulls it back to the first station. This is the basic operation of pneumatic tube systems. Suffice it to say that there are other elements which make up said systems such as mechanisms for loading and unloading carriers from the tube at the first and second stations.

The most costly and complex portions of a pneumatic tube system generally are the blower used to create the pressure and suction for moving the carrier and the valves used for alternatively applying pressure and suction to the tube. A typical blower and valve arrangement is shown in U.S. Pat. No. 2,912,066. This system employs four (4) valves positioned about a blower. These valves are actuated in pairs so as to either connect one port of the blower in an airtight manner to the tube while opening the other port of the blower to atmosphere. The system of this Patent is expensive to produce due to the cost of the four (4) valves, piping, and the electrical circuitry necessary to actuate the valves in the proper combinations. In addition, the blower of said system must be large to overcome the resistance to air flow created by the valves. The large number of cycles that the valves must make during operation of such a system increases the probability of valve failure. Another problem with systems of the type disclosed in this Patent is that the large blower, piping, and valves take up space at the station where they are located.

Later systems have attempted to reduce the cost associated with blower and valve arrangements for pneumatic tube systems by substituting the arrangement of four (4) valves with a single four-way valve. U.S. Pat. Nos. 4,135,684 and 3,659,809 disclose such arrangements. A single four-way valve, while less expensive than four (4) individual valves, is still a complex and expensive item. In addition, the flow resistance of a four-way valve, the tubing associated with such valve, and the potential for air leakage add to the size and power requirements of the blower which must be used in such systems.

Another type of blower and valve arrangement for a pneumatic tube system is shown in U.S. Pat. No. 4,189,261. This system is designed to reduce noise due to the rapid changes in air pressure which occur when pressure and suction are alternatively applied to a tube. In the arrangement shown in this Patent, the blower is placed in a divided enclosure so as to provide adjacent pressure and outlet ports. These ports are connected to an external air shifter valve which rotates between positions adjacent to the pressure and suction ports of the valve. The outlet of the air shifter valve is connected by a flexible tube to the end of the pneumatic tube. Thus by positioning the opening of the air shifter valve over one of the ports, suction or pressure is applied to the tube. While this system is less complex than systems which employ conventional four-way valves, certain deficiencies are apparent. The air shifter valve is complex and awkward as it requires considerable arcuate movement between positions over the two (2) ports. This may adversely affect its reliability. Also, there would likely be air leakage between the base plate and pivoting member of the valve. This air loss combined with the flow restriction associated with the valve and the flexible tubing to which it is connected would create losses requiring greater air flow and thus larger blower size. All of these factors add to the costs of such systems.

Thus there exists a need for a blower and valve apparatus for pneumatic tube systems which is less expensive to manufacture and operate, is more reliable, and is more energy efficient than those which are presently available.

DISCLOSURE OF INVENTION

It is an object of the present invention to provide a blower and valve apparatus for a pneumatic tube system that has very few component parts.

It is a further object of the present invention to provide a blower and valve apparatus for a pneumatic tube system which has enhanced reliability.

It is a further object of the present invention to provide a blower and valve apparatus for a pneumatic tube system which is less expensive to manufacture.

It is a further object of the present invention to provide a blower and valve apparatus for a pneumatic tube system that is more energy efficient.

It is a further object of the present invention to provide a blower and valve apparatus for a pneumatic tube system which incorporates the function of the blower and valves into a device having a unitary housing.

It is a further object of the present invention to provide a blower and valve apparatus for a pneumatic tube system which occupies less space.

Further objects of the present invention will be made apparent in the attached Best Modes for Carrying Out the Invention and the appended claims.

The foregoing objects are accomplished by a valve and blower apparatus for installation in a first station of a pneumatic tube system. The apparatus is connected directly to an end of the pneumatic tube. The assembly comprises a divided housing, enclosing a small conventional blower fan. The fan is operated so as to create pressure in one side of the housing and suction in the other. Each side or area of the housing has two (2) outlets; one to a centrally located neutral area or neutral chamber and the other to atmosphere. The neutral chamber has a single outlet which is connected directly to the end of the pneumatic tube. A rotable vane which serves as air flow director means is positioned in each side of the housing. Each vane is mounted on a shaft. The shafts extend through the housing and are free to rotate therein. Each vane is positioned such that in a first arcuate position, it blocks the opening to the neutral chamber and in a second arcuate position, blocks the opening to atmosphere. The outlets and vanes are symetrically arranged so that both shafts of the apparatus rotate through the same arcuate angle between the first and second vane positions.

A link is attached to each shaft outside the housing. The links are connected together by a connecting rod so that both shafts rotate together through the angle between the first and second vane positions. An electrical solenoid actuator responsive to control signals is used to move the links and connecting rod. The links, connecting rod and solenoid actuator form a control linkage for moving the vanes in tandem. The control linkage is arranged such that in a first position, the vane in the suction area closes the outlet to atmosphere which opens the outlet to the neutral chamber while the vane in the pressure area closes the outlet to the chamber, leaving the outlet to atmosphere in the pressure area open. In this first position suction is applied to the neutral chamber and thus to the tube. In a second position of the control linkage, the vane in the suction area closes the outlet to the neutral chamber while the vane on the pressure area closes the outlet to atmosphere. In this position the outlet from the pressure area is open to the neutral chamber and thus pressure is applied to the tube.

The actuator is adapted to move the control linkage between its first and second positions. By changing the electrical condition of the solenoid actuator, pressure and suction are selectively applied to the pneumatic tube.

BEST MODES FOR CARRYING OUT INVENTION

Figure 1:
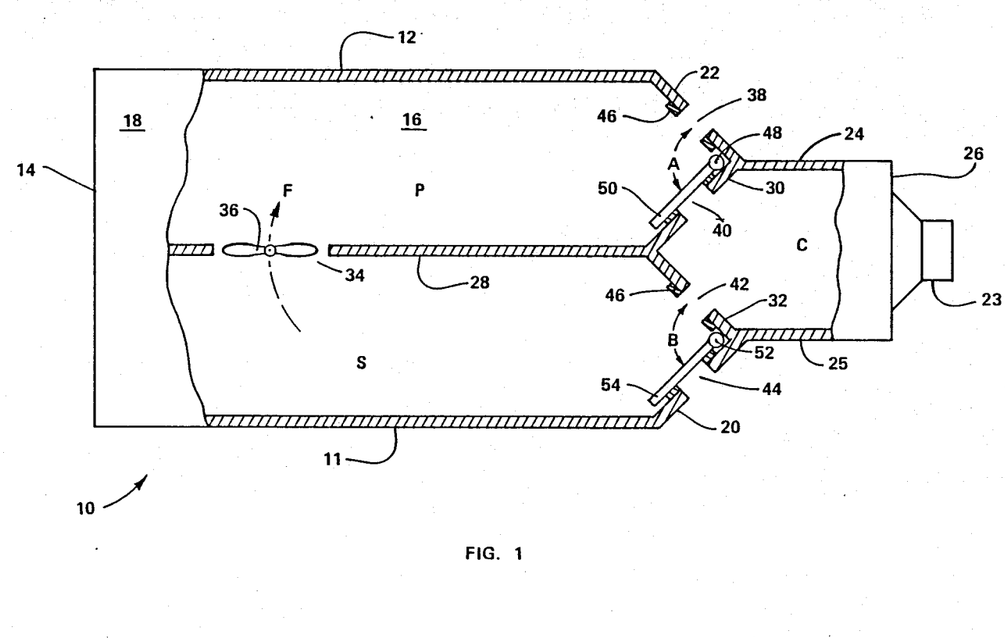
FIG. 1 is a partially sectioned view of a first embodiment of the blower and valve apparatus of the present invention in operative position to apply suction to an associated pneumatic tube.

Referring now to the drawings and particularly to FIG. 1, there is shown a first embodiment of the blower and valve apparatus of the present invention. The apparatus is contained in a housing generally indicated 10. Housing 10 includes a pair of side walls 11 and 12, a back wall 14, a bottom wall 16, and a top wall 18. Housing 10 also has a pair of angled outer walls 20 and 22, a pair of neutral chamber walls 24 and 25, and a chamber termination wall 26. Termination wall 26 includes a coupling 23 which serves as tube connecting means and connects to the end of a pneumatic tube (not shown).

Housing 10 has a central dividing wall 28 which is parallel to side walls 11 and 12 and which extends between top 18 and bottom 16. An angled inner wall 30 extends inside housing 10 between dividing wall 28 and the intersection of angled outer wall 22 and chamber wall 24. Wall 30 is parallel to outer wall 20. An angled inner wall 32 parallel to wall 22 and perpendicular to wall 30 extends between dividing wall 28 and the intersection of angled outer wall 20 and chamber wall 25. The walls of housing 10 in the preferred embodiment are comprised of molded plastic material such as polystyrene. Although in the preferred embodiment the angled inner and outer walls are perpendicular, other relationships may be equally satisfactory.

Dividing wall 28 incorporates a first circular air passage opening 34. Although the first air passage could be a duct, tube, a plurality of holes or other air passage means, in this embodiment opening 34 is a single hole through dividing wall 28. Fan means 36 shown schematically in FIG. 1 is mounted in an air tight manner in opening 34 by mounting means (not shown). Fan means 36 is operated by motor means (not shown) to cause air to flow in the direction of dotted arrow F as shown in FIG. 1. The operation of fan 36 causes the air pressure to be above ambient in the enclosed compartment bounded by dividing wall 28, back wall 14, side wall 12, angled outer wall 22, angled inner wall 30, top wall 18, and bottom wall 16. This pressure area is labeled P in FIG. 1.

The operation of fan 36 also causes the air pressure to be below ambient in the enclosed compartment bounded by dividing wall 28, back wall 14, side wall 11, angled inner wall 32, angled outer wall 20, top wall 18 and bottom wall 16. This suction area is labeled S in FIG. 1.

Angled outer wall 22 incorporates a second circular opening 38 for air passage between area P and the outside atmosphere. Angled inner wall 30 incorporates a third circular opening 40 for air passage similar in size and adjacent to opening 38. Opening 40 extends between area P and the enclosed compartment bounded by angled inner walls 30 and 32, chamber walls 24 and 25, and chamber termination wall 26. This neutral area is designated as chamber C in FIG. 1.

Angled inner wall 32 incorporates a fourth circular opening 42 similar in size to openings 38 and 40. Opening 42 extends between area S and chamber C. Angled outer wall 20 likewise incorporates a fifth circular opening 44 adjacent to opening 42 and similar to the others. Opening 44 extends between area S and atmosphere.

Openings 38, 40, 42, and 44 all incorporate gaskets 46 about their periphery on the inside of housing 10. Gaskets 46 are of soft elastimer material. Gaskets 46 are affixed to their associated angled walls by attachment means (not shown).

Although for this embodiment openings 38, 40, 42 and 44 are single holes in the internal dividing walls of the housing, in other embodiments they may be ducts, tubes, a plurality of holes or other air passage means which terminate in the areas each connects.

A shaft 48 extends through area P in housing 10. Shaft 48 is located adjacent the intersection of walls 22 and 30 and extends through holes (not separately shown) in top 18 and bottom 16. While shaft 48 is free to rotate in the housing, it is prevented from lateral movement by locking means (not shown). The shaft mounting holes in the top and bottom of the housing are sized to enable rotation of shaft 48 but to minimize clearance so as to minimize loss of air pressure from area P.

Figure 2:
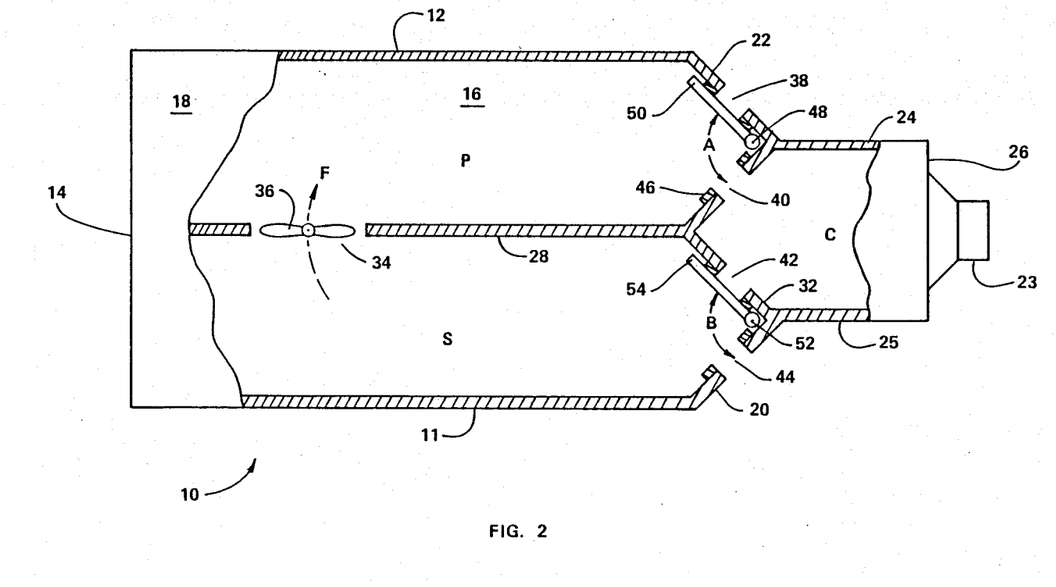
FIG. 2 is a partially sectioned view of the first embodiment of the blower and valve apparatus of the present invention in operative position to apply pressure to an associated pneumatic tube.

A planar flapper vane 50 is fixably attached at one end by attaching means (not separately shown) to shaft 48. Flapper vane 50 is free to rotate along arc A in FIG. 1. Flapper vane 50 is sized so as to fully cover opening 40 at the first extreme of its movement along arc A and to fully cover opening 38 at the other extreme of its movement which is shown in FIG. 2. Flapper vane 50 serves as air flow director means.

A shaft 52 extends through area S in housing 10. Shaft 52 like shaft 48 extends through holes in the top and bottom of housing 10. Shaft 52 is located adjacent the intersection of walls 32 and 20. As is the case with shaft 48, the holes in which shaft 52 is journaled are sized to enable rotational movement but minimize air loss. Also, locking means (not separately shown) on shaft 52 prevent lateral movement.

A second planar flapper vane 54 is fixably attached at one end by attaching means (not separately shown) to shaft 52. This allows flapper vane 54 to rotate along arc B as shown in FIG. 1. Flapper vane 54 is sized to fully cover opening 44 at a first extreme of its movement and to cover opening 42 with the other extreme of its movement as shown in FIG. 2. Flapper vanes 50 and 54 are preferably made of stamped aluminum and of sufficient thickness so as to not deform during operation.

The angled inner and outer walls of housing 10, and shafts 48 and 52 are symmetrically arranged so that the shafts rotate through the same arcuate angles between the extreme positions of their associated flapper vanes.

Figure 3:
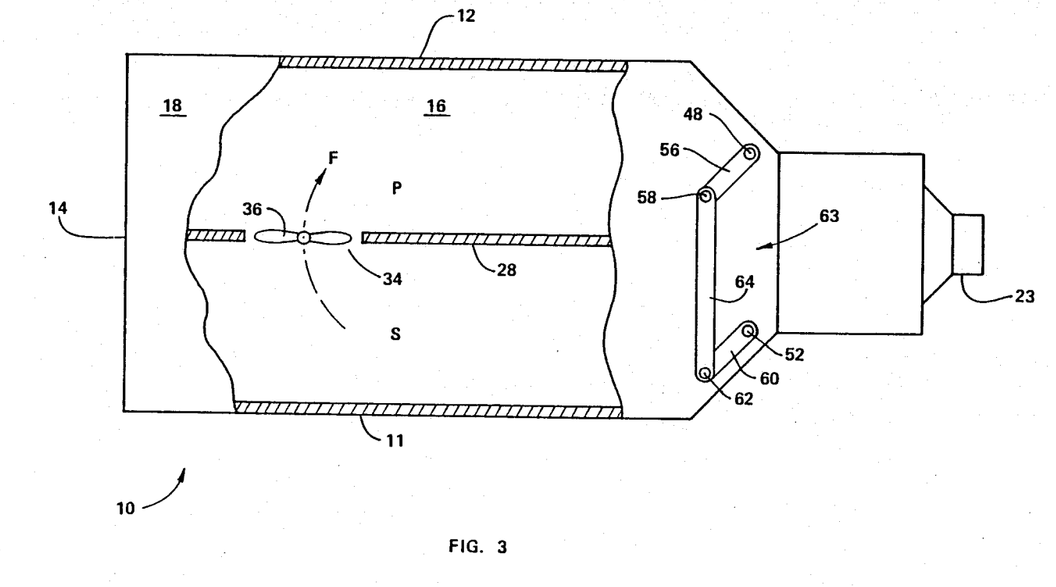
FIG. 3 is a partially sectioned view of the first embodiment of the blower and valve apparatus of the present invention showing the location of the external control linkage when suction is applied to an associated pneumatic tube.

Mounted external to housing 10 on shaft 48 is a link 56 (see FIG. 3). Link 56 is fixably attached to shaft 48 by attachment means (not shown). Link 56 is mounted on shaft 48 such that it extends in the same direction as flapper vane 50 inside the housing. Link 56 incorporates a perpendicular pin 58 at the end opposed to where it attaches to shaft 48.

A link 60 is mounted on shaft 52 external to housing 10 and is fixably attached to shaft 52 by attaching means. Link 60 is identical to link 56. Link 60 is mounted on shaft 52 in the same direction as flapper vane 54. Link 60 is similar in construction to link 56 and incorporates a perpendicular pin 62.

A connecting rod 64 extends between links 56 and 60. The connecting rod incorporates bearing means (not separately shown) which accept pins 58 and 62. An actuator (not shown) is connected to link 56 and adapted to move it between its extreme arcuate positions. The actuator, links 56 and 60 and connecting rod 64 serve as a control linkage (generally indicated 63) for moving the flapper vanes. Thus, when links 56 and 60 are in the position shown in FIG. 3, the flapper vanes are positioned inside housing 10 as shown in FIG. 1. Likewise, when links 56 and 60 move to the position shown in FIG. 4, the flapper vanes are located as shown in FIG. 2. The control linkage moves between the positions shown in FIGS. 3 and 4 depending on the condition of the activator. It is desirable to use actuator means which exerts a force which would tend to move the linkage beyond its extremes of movement to insure that the flapper vanes are always in solid contact with their associated gaskets 46 for reasons which will be explained later. An electrical solenoid actuator has been found to be a suitable actuator for the control linkage.

The operation of the first embodiment of the valve and blower apparatus will now be explained. When flapper vanes 50 and 54 are located as shown in FIG. 1, gaskets 46 cooperate with their associated flapper vanes to prevent any air movement through openings 40 and 44. With the vanes in this position, air is pushed from area P by operation of fan 36 to atmosphere through opening 38 due to opening 40 being blocked by flapper vane 50. The action of fan 36 creates suction in area S causing air to be pulled into coupling 23 through chamber C and opening 42, and finally into area S. With the vanes in this position, no air is pulled into area S through opening 44 because it is closed by flapper vane 54.

As a result of the air flow pattern created by the positions of the flapper vanes in FIG. 1, suction is applied at coupling 23. Coupling 23 is connected to the end of the tube. Therefore, in this position a carrier would move toward the end of the tube where the apparatus of the present invention is located.

Because of the suction created in area S, atmospheric pressure will tend to push flapper vane 54 away from opening 44. This is why it is desirable for the actuator means of the control linkage to apply some force to hold the flapper vanes in position firmly against gaskets 46 to insure an air-tight seal. The force tending to open opening 44 is to some extent countered by the pressure in area P tending to push against flapper vane 50. This lowers the amount of force which the actuator means must supply.

Figure 4:
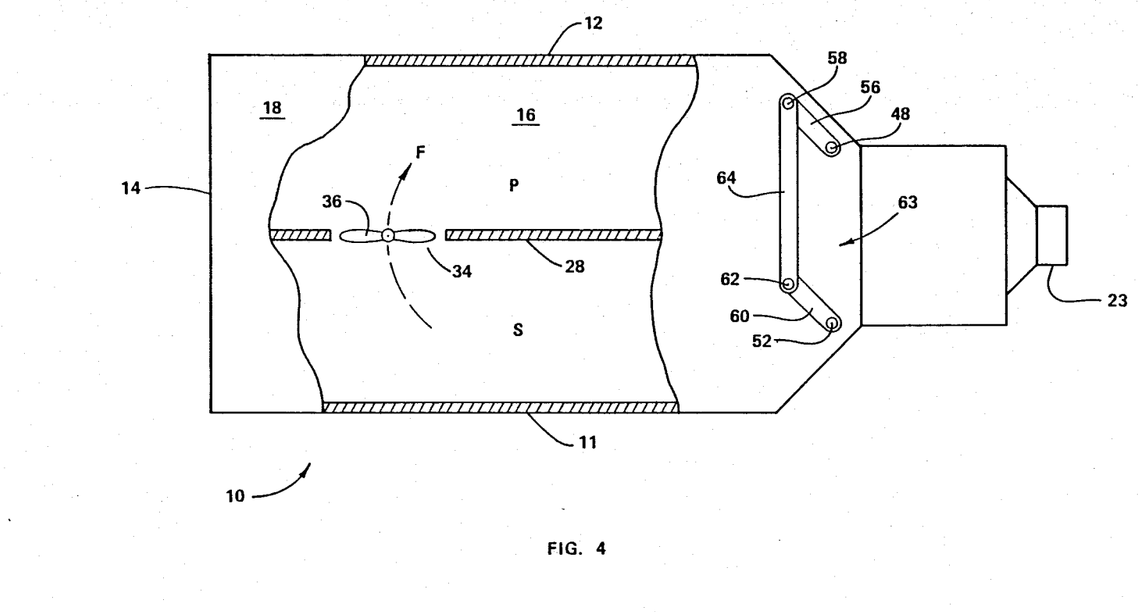
FIG. 4 is a partially sectioned view of the first embodiment of the blower and valve apparatus of the present invention showing the position of the external control linkage when pressure is applied to an associated pneumatic tube.

To apply pressure to the pneumatic tube, the electrical condition of the solenoid is changed causing control linkage 63 to move to the position shown in FIG. 4. This results in flapper vanes 50 and 54 being positioned as shown in FIG. 2. In this condition air is drawn into area S through opening 44 as opening 42 to chamber C is blocked. The high pressure air in area P passes through opening 40 into chamber C as opening 38 is blocked. The high pressure air passes through chamber C and coupling 23 and into the pneumatic tube. In this condition a carrier in the tube would be pushed by air pressure away from the valve and blower apparatus.

It will be understood by those skilled in the art that it is possible to construct other embodiments for the apparatus of the present invention without the neutral chamber C. Rather third circular opening 40 and fourth circular opening 42 may be connected by ducts or other air passage means to a common outlet port which leads to the pneumatic tube.

Figure 5:
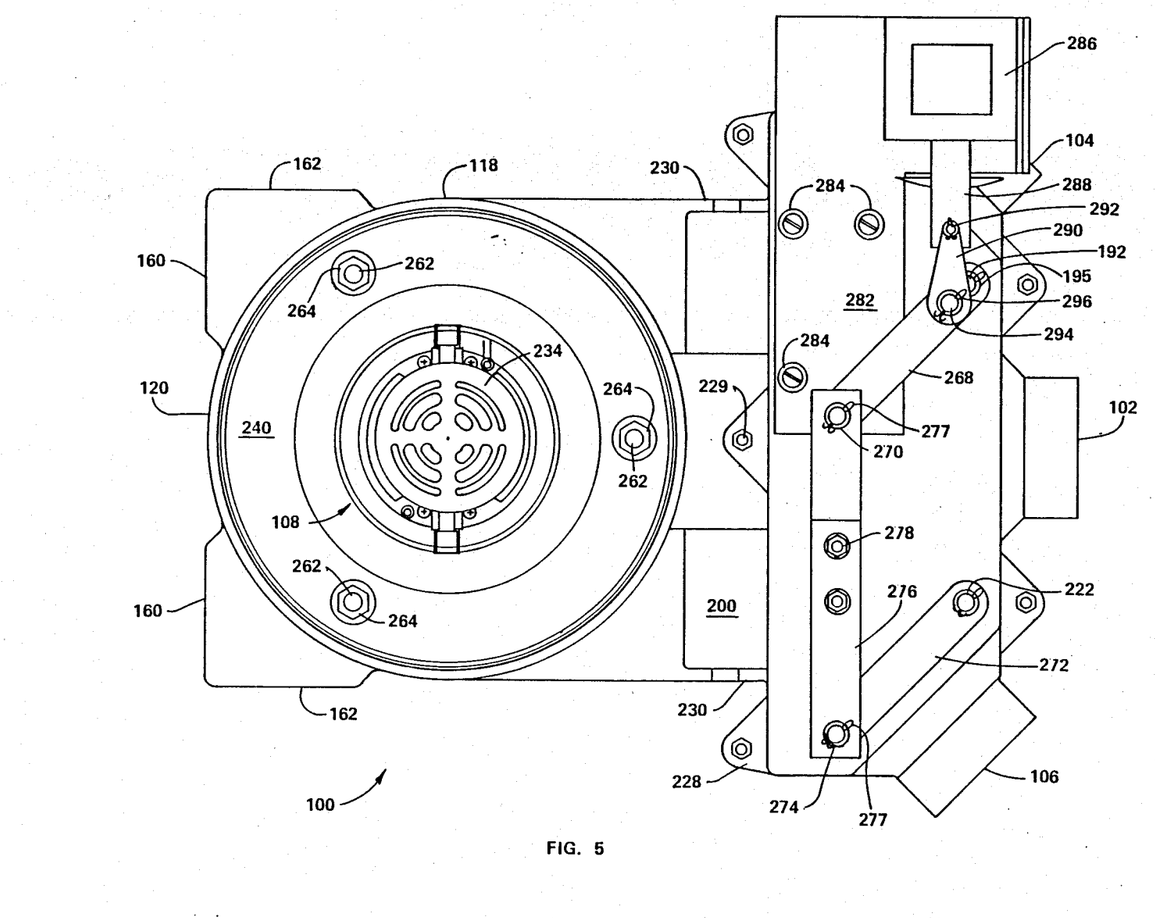
FIG. 5 is a right side view of an alternative embodiment of the blower and valve apparatus of the present invention.

An alternative embodiment of the blower and valve apparatus of the present invention is shown in FIG. 5. The apparatus includes a housing generally indicated 100 incorporating a coupling 102 for connection to the end of a pneumatic tube (not shown). Housing 100 also incorporates air outlets 104 and 106. Housing 100 also incorporates two blower fan assemblies 108 (see FIG. 7).

Figure 6:
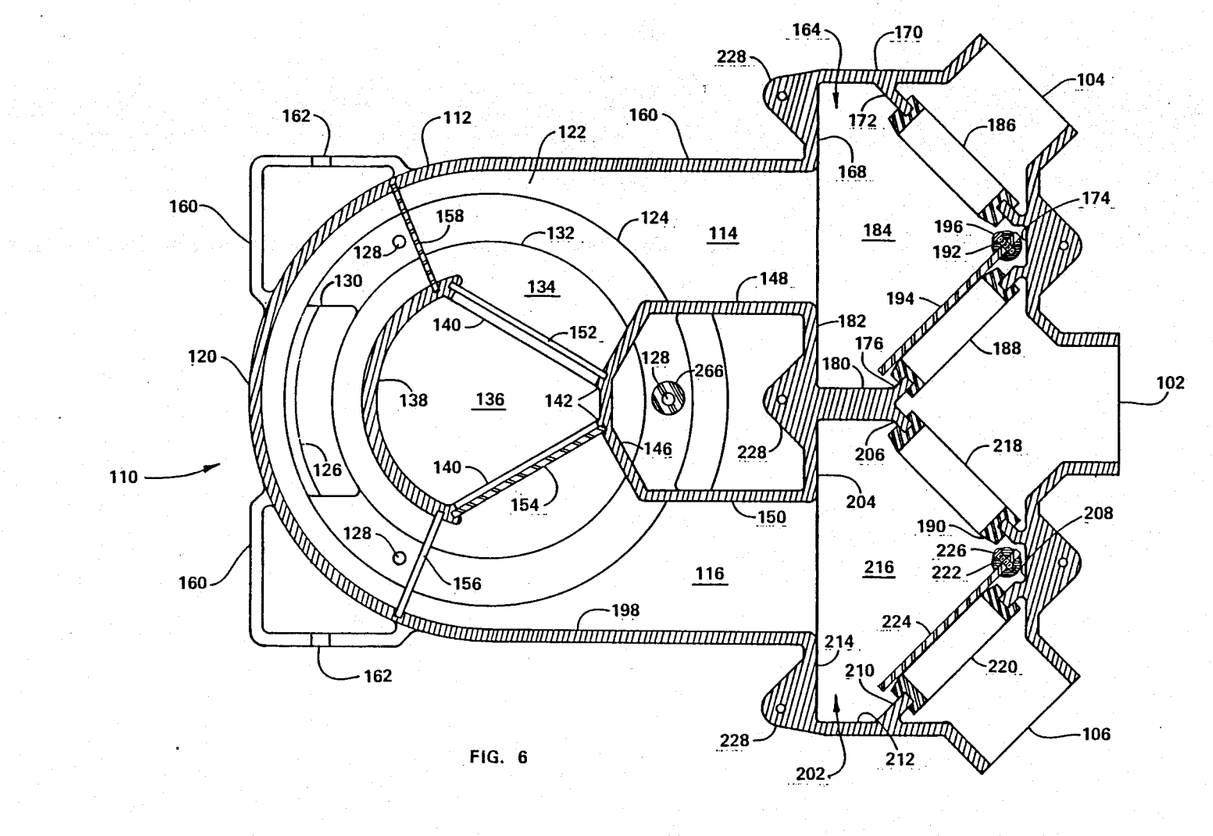
FIG. 6 is a longitudinal sectional view of the alternative embodiment of the blower and valve apparatus of the present invention shown in operative condition to apply pressure to an associated pneumatic tube.

Housing 100 is comprised of two identical longitudinal half-sections 110 shown in FIG. 6. Half-sections 110 in their preferred form are made of molded polystyrene plastic material. Section 110 is comprised of a circular pan portion 112 (see FIG. 7), a suction area 114, and a pressure area 116.

Figure 7:
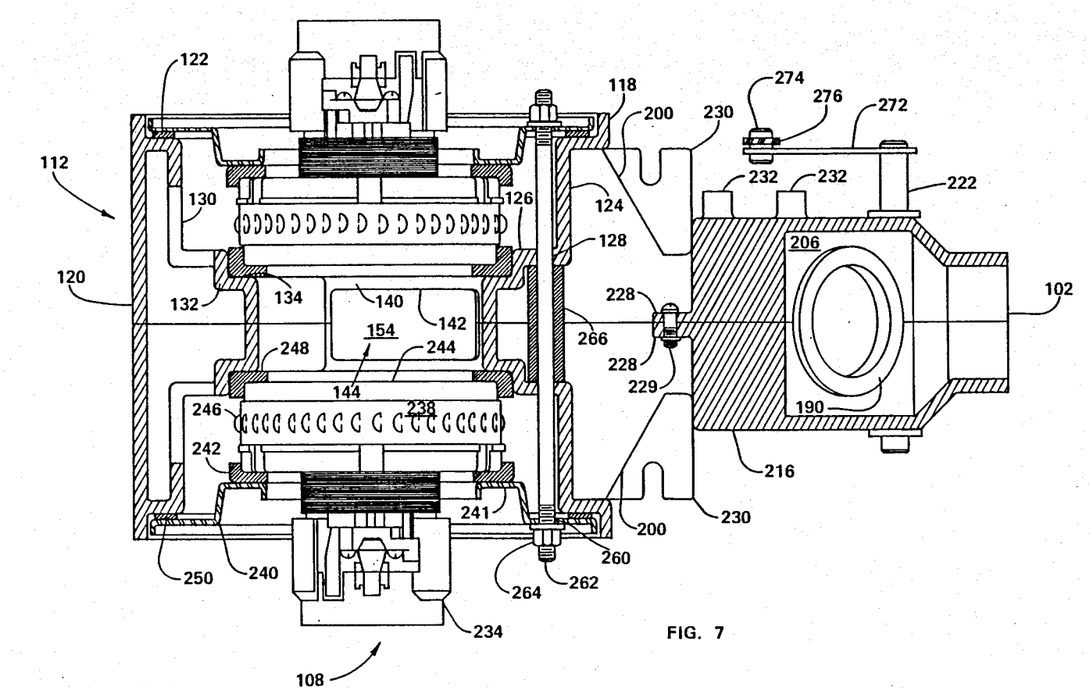
FIG. 7 is a lateral cross sectional view of the alternative embodiment of the blower and valve apparatus of the present invention.

Pan portion 112 includes a circular lip 118 (see FIG. 7). At the rear portion of the housing circular lip 118 is integral with a back wall 120 of section 110. Pan 112 also incorporates an outer step 122 and an outer lining wall 124. Outer lining wall 124 terminates in an intermediate inner step 126. Intermediate step 126 incorporates three (3) uniformly spaced holes 128. An opening 130 is cut into intermediate step 126 and outer lining wall 124 at the rear of section 110. The purpose of opening 130 will be later discussed.

Pan portion 112 also includes a short intermediate lining wall 132 which terminates at an inner step 134. Inner step 134 connects to a pie-shaped opening 136 which is bounded by a semi-circular back wall 138 and two angled walls 140 (see FIG. 6). Back wall 138 is of sufficient height to mate with a corresponding wall in an opposed housing section when the blower and valve apparatus is assembled. A pair of identical elongated notches 142 are cut in angled walls 140. Elongated notches 142 are configured so as to create two (2) rectangular openings generally designated 144 when the housing sections are assembled (see FIG. 7).

Angled walls 140 terminate at a saucer-shaped front wall 146. Wall 146 is of similar height to back wall 138 so as to mate with a corresponding wall in an opposing section upon assembly. Front wall 146 is integral with inner step 134, intermediate lining wall 132, and intermediate step 126. Front wall 146 terminates in parallel inner-area walls 148 and 150, the functions of which are later explained.

Figure 9:
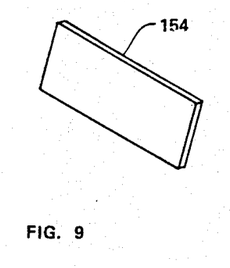
FIG. 9 is a perspective view of a low pressure air diverter plate of the alternative embodiment of the blower and valve apparatus of the present invention.

A pair of slots 152 are formed around the perimeter of elongated notches 142 in back wall 138, inner step 134, and front wall 146. A rectangular low pressure air diverter wall plate 154 is installed in slots 142. Air diverter plate 154 is sized so as to be accepted into a corresponding slot to slot 152 in an identical opposing section upon assembly of housing 100. Air diverter plate 154 when installed serves to block one of the pair of openings 144. The opening 144 not blocked by the low pressure air diverter plate remains open to serve as a first air passage means as will be explained later. Low pressure air diverter wall plate 154 is shown in FIG. 9. In the preferred embodiment low pressure air diverter wall plate 154 is made from stamped steel material having a thickness slightly less than the width of slots 152 to provide snug assembly which prevents air flow around the plate.

Figure 10:
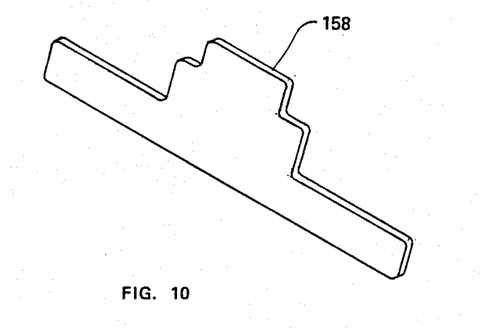
FIG. 10 is a perspective view of a high pressure air diverter plate of the alternative embodiment of the blower and valve apparatus of the present invention.

A second pair of slots 156 are formed in back wall 138, inner step 134, intermediate lining wall 132, intermediate step 136, outer lining wall 124, and outer step 122. A high pressure air diverter wall plate 158 is installed in one of the slots 156, generally opposite in pan portion 112, to low pressure air diverter wall plate 154. High pressure air diverter wall plate 158 is sized so as to extend into an opposed identical housing section upon assembly and mate with a corresponding slot formed therein. High pressure air diverter wall plate 158 is separately shown in FIG. 10. In the preferred embodiment high pressure air diverter wall plate 158 is made from stamped steel material having a thickness slightly less than the width of slots 156. This provides snug assembly and minimizes air flow around the plate.

Slots 152 and 156 are arranged in pairs so that a formed section identical to section 110 can be used for the other longitudinal half of housing 100. The upper and lower portions of section 110 are mirror images. Thus, when housing 100 is formed by assembling the sections, plate 158 is accepted and held by a first of the slots 156 in one of the sections and the "mirror image" slot of the pair in the opposing section. In this way plate 158 blocks the internal "T" shaped air passage between pan 112 and back wall 120 created when housing 100 is assembled (see FIG. 7). Likewise, the mirror image slots 152 for acceptance of low pressure air diverter plate 154, provide for blocking one of the pair of rectangular air passages 144 created upon assembly of the housing sections.

Back wall 120 of pan portion 112 incorporates ear pieces 160, which include holes 162. Holes 162 may be used for securing housing 100 to mounting means (not shown).

Suction area 114 is molded integral with section 110. Area 114 is bounded by a top outer wall 160, an angled outer side wall 162, inner-area wall 148, front wall 146, pan 112, and high pressure air diverter plate 158. Suction area 114 is open to pie-shaped opening 136 as shown in FIG. 6.

Suction area 114 opens into a low pressure valve chamber 164. Chamber 164 is molded integral with section 110. Low pressure chamber 164 is bounded by an upper side wall 168, a top wall 170, an angled upper wall 172, a front wall 174, an angled lower wall 176 (perpendicular to wall 172), a central housing dividing wall 180, a lower side wall 182, and an outer wall 184. Angled upper wall 172 incorporates a half circular opening 186. Angled lower wall 176 also incorporates a half circular opening 188. Opening 186 is open to air outlet 104. Opening 188 opens into coupling 102 which when housing 100 is assembled is connected to the pneumatic tube. Openings 186 and 188 mate with openings in a corresponding opposed section when housing 100 is assembled to create circular air passage openings. Openings 186 and 188 incorporate gasket means 190 for purposes to be later explained.

Figure 12:
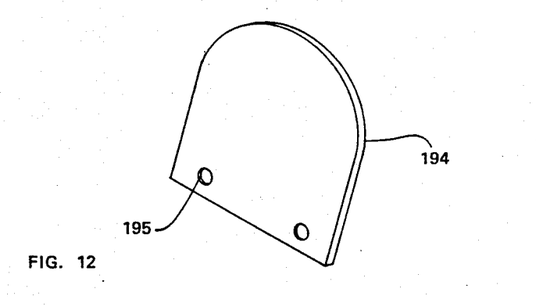
FIG. 12 is a perspective view of a flapper vane of the alternative embodiment of the blower and valve apparatus of the present invention.

A shaft 192 extends through low pressure air chamber 164 and is positioned between openings 186 and 188. A planar flapper vane 194 is mounted at one end to shaft 192 by a locking means 196. Flapper vane 194 is made of stamped aluminum material in the preferred embodiment and is configured as shown in FIG. 12. The flapper vane incorporates holes 195 for accepting locking means 196. Flapper vane 194 is of sufficient size to cover the circular openings created when openings 186 and 188 mate with an opposing section. Shaft 192 is of sufficient length to extend through and be journaled in a hole in outer wall 184 (not separately shown) and to extend through in a corresponding hole in an outer wall of an opposed section when housing 100 is assembled. The holes in section 110 are sufficient size to allow shaft 192 to rotate freely but are not so large as to allow significant air to pass through the clearance available when the shaft is mounted in position. Shaft 192 is prevented from lateral movement by locking means 195 positioned on each side of housing 100 (see FIG. 5).

Pressure area 116 is molded integral with section 110. Area 116 is bounded by a lower outer wall 198, pan portion 112, high pressure air diverter plate 158, wall 138, low pressure air diverter plate 154, front plate 146, inner-area wall 150, and an angled outer wall 200. Pressure area 116 is open to slot 130 which is an air passage thereto.

Pressure area 116 opens into a high pressure valve chamber 202 molded integrally into section 110. High pressure valve chamber 202 is bounded by a vertical upper wall 204, housing dividing wall 180, an angled upper wall 206, a front wall 208, an angled lower wall 210 (perpendicular to wall 206), a lower housing wall 212, a vertical lower wall 214, and an outer wall 216.

Angled wall 206 incorporates a half circular opening 218. Opening 218 opens into coupling 102 which connects to the pneumatic tube. Angled wall 210 also incorporates an opening 220. Opening 220 opens into air outlet 106. Openings 218 and 220 incorporate gasket means 190. Circular air passage openings are formed by half circular openings 218 and 220 when identical opposing sections are assembled to form housing 100.

A shaft 222 extends through high pressure valve chamber 202. A flapper vane 224 is mounted to shaft 222 by locking means 226. The construction and mounting of shaft 222 and flapper vane 224 in high pressure valve chamber 202 are similar to the mounting and construction of shaft 192 and flapper vane 194 in low pressure valve chamber 164.

Section 110 also incorporates a plurality of ear means 228. Fastening means 229 extend through ear means 228 to hold opposing housing sections together to form housing 100 (see FIG. 7). Section 110 also incorporates foot means 230 which can be used to attach housing 100 to mounting means (not shown). Section 110 also incorporates four (4) external raised blind holes 232 (see FIG. 7), the purpose of which will be later described.

Figure 11:
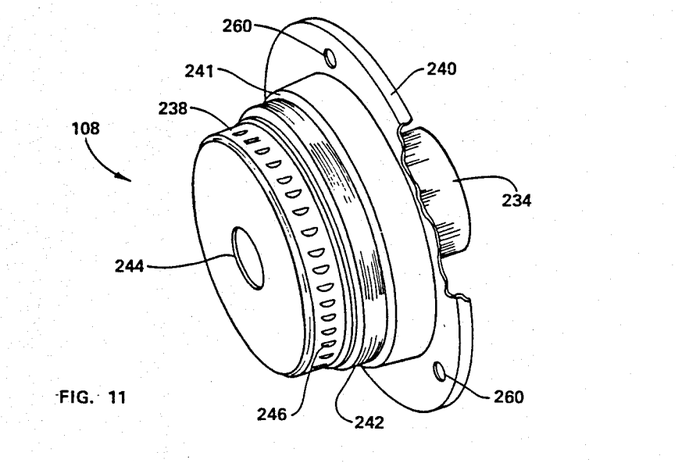
FIG. 11 is a perspective view of a fan assembly of the alternative embodiment of the blower and valve apparatus of the present invention.

A pair of sections 110 are mounted in opposing fashion to form housing 100 as shown in FIG. 7. The opposing sections operate to enclose areas 114 and 116 and valve chambers 164 and 202 and to create the air flow passageways necessary to the operation of the preferred embodiment of the present invention. A pair of fan assemblies 108 are mounted in opposed fashion in the pan portions 112 of the sections. Fan assembly 108 includes an electric motor 234. Motor 234 is connected to a cylindrical blade housing 238. In the preferred embodiment the electric motors and blade housing are Model No. 371084FB manufactured by the Lamb Company. The motor and blade housing are of the type commonly used in vacuum cleaners. Assemblies 108 also include a backing plate 240. Backing plate 240 includes a lip portion 241. Backing plate 240 is fixably attached to rubber gasket means 242 by attachment means (not shown) at lip portion 241. Gasket means 242 is fixably attached to the outer portions of blade housings 238 by attachment means. Housing 238 includes an air inlet 244 and a plurality of outlets 246 about the outside of housing 238. A perspective view showing fan assembly 108 is shown in FIG. 11.

When motor 234 is operated, air is pulled into air inlet 244 at the front of housing 238 and high pressure air is exhausted from outlets 246 at the outer circumference of housing 238. Fan assemblies 108 are installed in housing 100 such that air inlets 244 are positioned adjacent to the pie-shaped openings 136 in their respective sections 110. Gasket means 248 are positioned between blade housing 238 and inner step 134 to insure that air is pulled into inlet 244 only through the pie-shaped openings. Gasket means 250 is positioned between backing plate 240 and outer step 122 of pan portion 112. Gasket means 250 insures that the high pressure air from outlets 246 cannot escape to the atmosphere around backing plate 240.

Backing plate 240 of motor assembly 108 incorporates holes 260 which correspond to positions of holes 128 in pan portion 112. Bolt means 262 extend through the backing plate 240 of fan assemblies 108 and the pan portions 112 of housing 100. Nut means 264 on each end of bolt means 262 hold the fan assemblies in position and in addition, help to hold sections 110 together in an airtight manner. A rubber spacer 266 is used to insure that air does not escape through holes 128 in housing 100 in the open area between the pans and the outside of area walls 148 and 150.

Shafts 222 and 192 extend out from housing 100 on one side as shown in FIG. 7. A link 268 is fixably attached to shaft 192 (see FIG. 5). Link 268 extends in a direction corresponding to the direction of flapper vane 194 inside the housing. Link 268 incorporates a perpendicular pin 270. A link 272 is fixably attached to shaft 222 at an angle corresponding to the position of flapper vane 224. Link 272 incorporates a perpendicular pin 274. A connecting rod 276 extends between links 268 and 272. Pins 270 and 274 are accepted into holes (not separately shown) in connecting rod 276 and are free to rotate therein. Pins 270 and 274 are secured in connecting rod 276 by attaching means 277. Connecting rod 276 incorporates adjustment means 278 which can be used to slightly extend or shorten connecting rod 276.

An L-shaped mounting plate 282 incorporates four (4) holes (not separately shown). The positions of the holes in L-shaped mounting plate 282 correspond to the positions of raised mounting holes 232 in section 110. Fastening means 284 are used to fasten L-shaped mounting plate 282 to section 110 as shown in FIG. 5. Although each housing section 110 has a set of mounting holes 232, only one set is used for an assembled housing as only one mounting plate 282 is required. The unused holes serve no purpose other than to allow the opposing sections 110 which form housing 100 to be identical.

A solenoid 286 is mounted by fastening means (not separately shown) to L-shaped mounting plate 282. Solenoid 286 includes an actuator 288 which is located up or down depending on whether the solenoid is energized. Actuator 288 terminates in an arm 290. Arm 290 is free to rotate about a pivot 292. Arm 290 incorporates a hole (not separately shown) and a pin 294 integral with link 268 extends from said link and is accepted into the hole in arm 290. Pin 294 is free to rotate in the hole in arm 290 but is prevented from becoming detached therefrom by locking means 296. Because link 268 is connected to link 262 by connecting rod 276, the links move together and thus shafts 192 and 222 rotate together upon movement of solenoid actuator 288.

The arrangement of links 268 and 272, connecting rod 276, arm 290, solenoid 286 and actuator 288 form a control linkage. The control linkage is arranged so that for a first unenergized condition of solenoid 286, flapper vanes 194 and 224 are in the position shown in FIG. 6. Energizing solenoid 286 causes the flapper vanes to move to the positions shown in FIG. 8. Thus the control linkage provides means for rotating shafts 192 and 222 which in turn move their attached flapper vanes. The electrical condition of solenoid 286 is determined by conventional electrical control circuitry which energizes or de-energizes the solenoid depending on whether suction or pressure is desired in the tube. The control linkage in combination with the control circuitry provide means for controlling the position of the flapper vanes. Adjustment means 278 on connecting rod 276 can be used to extend or shorten the connecting rod to insure that both flapper vanes contact fully their associated gasket means 190. Applicants have found that the weight of the links and connecting rod in the unenergized condition and the force exerted by the action of solenoid 286 in an energized condition is sufficient to hold the flapper vanes against their associated gaskets in a manner which minimizes air losses and provides for satisfactory operation of the alternative embodiment.

Having described the structure of the alternative embodiment of the blower and valve apparatus of the present invention, the air flow patterns through the apparatus will now be described. With solenoid 286 in the position shown in FIG. 5, flapper vanes 194 and 224 are in the position shown in FIG. 6. Thus air passage openings 188 and 220 are blocked. For this condition air flows into outlet 104 and into low pressure valve chamber 164. Air then travels into suction area 114 and around pan portion 112 where it is blocked by high pressure air diverter wall plate 158, which serves as a dividing means dividing the suction and pressure areas. The air travels into the unobstructed opening 144 and then through the pie-shaped openings 136 of the respective sections 110. Air is blocked from traveling through the second opening 144 by low pressure air diverter wall plate 154. Plate 154 also serves as dividing means for the suction and high pressure areas. From the pie-shaped openings the air flows in two paths into the inlets 244 of the fan blade housings 238 (see FIG. 7). The air is then brought to a high pressure in blade housings 238 and exhausted through outlets 246. The high pressure air is then forced to travel through openings 130 of the respective sections 110 and is thus recombined into a single flow path. Air flow back into the low pressure hemisphere is blocked by high pressure air diverter plate 158 and low pressure air diverter plate 154, and therefore the high pressure air is forced into pressure hemisphere 116. From the pressure hemisphere the air passes into high pressure valve chamber 202 where it is forced to pass out air passage opening 218 through coupling 102 and into the pneumatic tube.

Figure 8:
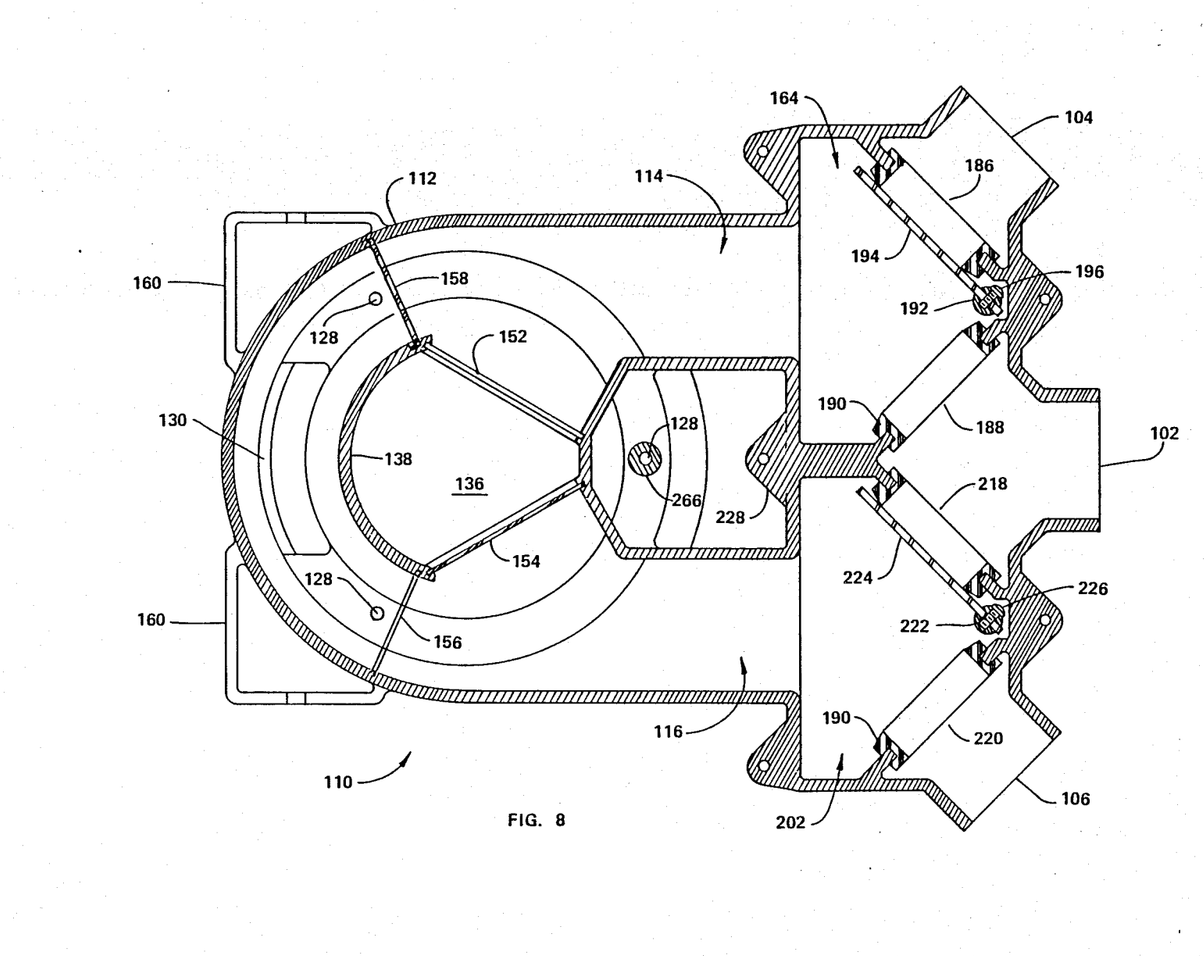
FIG. 8 is a longitudinal sectional view of the alternative embodiment of the blower and valve apparatus of the present invention shown in operative condition to apply suction to an associated pneumatic tube.

When solenoid 286 is energized, flapper vanes 194 and 224 move to the position shown in FIG. 8. In this condition air passage openings 186 and 218 are blocked. Low pressure valve chamber 164 draws air from the pneumatic tube while air in the high pressure valve chamber 202 is exhausted through air passage opening 220 and outlet 106 to atmosphere. Thus, pressure or suction is applied to the pneumatic tube by energizing or de-energizing solenoid 286.

In certain pneumatic tube applications it may be desirable to provide for ambient pressure in the pneumatic tube during certain periods such as during loading or unloading of carriers. In such cases those skilled in the art will understand that the electrical control circuitry and control linkage may be modified to provide for holding flapper vanes 194 and 224 in a position between the extreme arcuate positions shown in FIGS. 6 and 8. For such position both the pressure and suction areas are open to atmosphere and thus the tube is at atmospheric pressure.

The alternative embodiment of the blower and valve apparatus of the present invention uses identical housing sections into which all necessary features are integrally molded. This makes the alternative embodiment inexpensive to produce as only tooling necessary to mold section 110 is required to construct virtually all aspects of the housing. In addition, the alternative embodiment's use of standard "vacuum cleaner" style blower assemblies makes this embodiment inexpensive to produce and very energy efficient. While the invention may be operated with a plurality of flapper vanes and air passage ways, the use of a single vane in each of the suction and pressure areas in both embodiments simplifies construction and enhances reliability. Also, while the preferred embodiment employs a blower fan internally mounted within the apparatus, it is to be understood that the fan could be external and its pressure and suction ports connected to the pressure and suction areas of the apparatus via connecting means such as ducts or hoses. Thus, the new blower and valve apparatus of both embodiments of the present invention achieves the above-stated objectives, eliminates difficulties encountered in the use of prior devices, and solves problems and obtains the desirable results described herein.

In the foregoing description, certain items have been used for brevity, clarity, and understanding. However, no unnecessary limitations are to be implied therefrom because such terms are for descriptive purposes and intended to be broadly construed. Moreover, the descriptions and illustrations are by way of examples and the invention is not limited to the details shown or described.

Having described the features, discoveries, and principles of the invention, the manner in which it is constructed and operated, and the advantages and useful results obtained, the new and useful structures, devices, elements, arrangements, parts, calculations, systems, equipment, operations, and relationships are set forth in the appended claims.

We claim:

1. Apparatus for selectively applying pressure or suction to a pneumatic tube comprising:
   a housing;
   dividing means dividing said housing into compartments, said compartments including a suction area, a pressure area, and a neutral area;
   tube connecting means connecting the neutral area to the tube;
   first air flow passage means for air flow between said suction area and said pressure area;
   fan means for moving air from said suction area to said pressure area through said first air flow passage means;
   second air flow passage means for air flow between said suction area and atmosphere;
   third air flow passage means for air flow between said suction area and said neutral area;
   fourth air flow passage means for air flow between said pressure area and said neutral area;
   fifth air flow passage means for air flow between said pressure area and atmosphere;
   first air flow director means for directing air flow into said suction area, said first air flow director means having a first condition opening said third air flow passage means while closing said second air flow passage means, and a second condition opening said second air flow passage means while closing said third air flow passage means;
   second air flow director means for directing air flow out of said pressure area, said second air flow director means having a first condition opening said fifth air flow passage means while closing said fourth air flow passage means, and a second condition opening said fourth air flow passage means while closing said fifth air flow passage means; and
   control means for controlling the conditions of said first and second air flow director means, suction being applied to the tube when said first and second air flow director means are in their respective first conditions and pressure being applied to the tube when said first and second air flow director means are in their respective second conditions.

2. Apparatus according to claim 1 wherein said dividing means are dividing walls internal to said housing.

3. Apparatus according to claim 2 wherein the pressure area and suction area have at least one first common dividing wall and said first air flow passage means is at least one first opening in said first common dividing wall.

4. Apparatus according to claim 3 wherein said fan means is at least one blower positioned in said first opening.

5. Apparatus according to claim 1 wherein said first air flow director means comprises at least one suction area flapper vane, and further comprising: at least one second opening terminating said second air flow passage means in the suction area; at least one third opening terminating said third air flow passage means in said suction area; and first movement means responsive to said control means for moving said suction area flapper vanes between a first position and a second position corresponding to said first and second conditions of said control means respectively; said suction area flapper vanes in said first position closing the second openings and in second position closing the third openings.

6. Apparatus according to claim 5 wherein said second air flow director means comprises at least one pressure area flapper vane, and further comprising: at least one fourth opening terminating said fourth air flow passage means in the pressure area; at least one fifth opening terminating said fifth air flow passage means in the pressure area; second movement means responsive to said control means for moving said pressure area flapper vanes between a first position and a second position corresponding to said first and second conditions of said control means respectively and said pressure area flapper vanes in said first position closing said fifth openings and in said second position closing said fourth openings.

7. Apparatus according to claim 5 wheren said housing is comprised of at least one exterior wall and said dividing means are dividing walls internal to said housing.

8. Apparatus according to claim 7 wherein said suction area and said neutral area have at least one second common dividing wall and said third openings are holes through said second common dividing wall.

9. Apparatus according to claim 8 wherein said suction area is bounded by at least one exterior wall of said housing and said second openings are holes through said exterior wall.

10. Apparatus according to claim 9 wherein said second and third openings are each single holes positioned adjacent in said suction area; said first movement means includes a first rotable shaft; said suction area flapper vanes are a single planar positioned between said openings, one end of said vane attaching to said first rotable shaft; said first position is a first arcuate position of said first rotable shaft; and said second position is a second arcuate position of said first rotable shaft.

11. Apparatus according to claim 10 wherein the control means includes first shaft rotating means for rotating said first rotable shaft between said first and second positions.

12. Apparatus according to claim 11 wherein said second common dividin9 wall between the suction and neutral areas intersects with and is perpendicular to said first exterior wall and said first rotable shaft is positioned adjacent the intersection of said walls.

13. Apparatus according to claim 10 wherein said pressure area and said neutral area have at least one third common dividing wall and said fourth openings are holes through said third common dividing wall 14. Apparatus according to claim 13 wherein said pressure area is bounded by at least one exterior wall of said housing and said fifth openings are holes through said exterior wall.

15. Apparatus according to claim 14 wherein said fourth and fifth openings are each single holes positioned adjacent in said pressure area; said second movement means includes a second rotable shaft; said pressure area flapper vanes are a single planar vane, one end of said vane attaching to said second rotable shaft; said first position is a first arcuate position of said second rotable shaft; and said second position is a second arcuate position of said second rotable shaft.

16. Apparatus according to claim 15 wherein the angle between said respective first and second arcuate positions of said first and second rotable shafts are equal and said first and second shaft rotating means comprise a control linkage connecting said shafts and enabling movement of the pressure area flapper vane and suction area flapper vane in tandem between their respective first and second arcuate positions.

17. Apparatus according to claim 16 wherein said first and second rotable shafts extend through at least one exterior wall of said housing and said control linkage is mounted external to said housing.

18. Apparatus according to claim 17 wherein said housing is comprised of two identical longitudinal half sections.

19. Apparatus according to claim 18 wherein said half sections are comprised of molded plastic.

20. Apparatus according to claim 15 wherein the pressure area and suction area have at least one first common dividing wall and said first air passage means is at least one first opening in said first common dividing wall.

21. Apparatus according to claim 20 wherein said fan means is at least one blower positioned in said first opening.

22. Apparatus according to claim 21 wherein there are two first common dividing walls, two first openings, and two blowers.

23. Apparatus according to claim 1 wherein said second air flow director means comprises at least one pressure area flapper vane, and further comprising: at least one fourth opening terminating said fourth air flow passage means in the pressure area; at least one fifth opening terminating said fifth air flow passage means in the pressure area; and second movement means responsive to said control means for moving said pressure area flapper vanes between a first position and a second position corresponding to said first and second conditions of said control means respectively; said pressure area flapper vanes in said first position closing said fifth openings and in said second position closing said fourth openings.

24. Apparatus according to claim 23 wherein said housing is comprised of at least one exterior wall and said dividing means are dividing walls internal to said housing.

25. Apparatus according to claim 24 wherein said pressure area and said neutral area have at least one third common dividing wall and said fourth openings are holes through said common dividing wall.

26. Apparatus according to claim 25 wherein said pressure area is bounded by at least one exterior wall of said housing and said fifth openings are holes through said exterior wall.

27. Apparatus according to claim 26 wherein said fourth and fifth openings are each single holes positioned adjacent in said pressure area; said second movement means includes a second rotable shaft, said pressure area flapper vanes are a single planer vane, one end of said vane attaching to said second rotable shaft; said first position is a first arcuate position of said second rotable shaft, and said second position is a second arcuate position of said second rotable shaft.

28. Apparatus according to claim 27 wherein the control means includes second shaft rotating means for rotating said second rotable shaft between said first and second positions.

29. Apparatus according to claim 28 wherein said third common dividing wall between said pressure and neutral areas intersects with and is perpendicular to said second exterior wall and said second rotable shaft is positioned adjacent the intersection of said walls.

30. Apparatus for selectively applying pressure or suction at an outlet port comprising:
a housing;
dividing means dividing said housing into compartments, said compartments including suction area and a pressure area;
suction producing means for producing suction in the suction area;
pressure producing means for producing pressure in the pressure area;
second air flow passage means for air flow between said suction area and atmosphere;
third air flow passage means for air flow between said suction area and said outlet port;
fourth air flow passage means for air flow between the pressure area and said outlet port;
fifth air flow passage means for air flow between the pressure area and atmosphere;
first air flow director means for directing air flow into said suction area, said first air flow director means having a first condition opening said third air flow passage means while closing said second air flow passage means, and a second condition opening said second air flow passage means while closing said third air flow passage means;
second air flow director means for directing air flow out of said pressure area, said second air flow director means having a first condition opening said fifth air flow passage means while closing said fourth air flow passage means, and a second condition opening said fourth air flow passage means while closing said fifth air flow passage means; and
control means for controlling the conditions of said first and second air flow direction means, suction being applied at said outlet port when the first and second air flow director means are in their respective first conditions andpressure being applied at said outlet port when the first and second air flow director means are in their respective second conditions.

31. Apparatus according to claim 30 wherein said first air flow director means comprises at least one suction area flapper vane, and further comprising: at least one second opening terminating said second air flow passage means in the suction area; at least one third opening terminating said third air flow passage means in said suction area; and first movement means responsive to said control means for moving said suction area flapper vanes between a first position and a second position corresponding to said first and second conditions of said control means respectively; said suction area flapper vanes in said first position closing the second openings and in second position closing the third openings.

32. Apparatus according to claim 31 wherein said second air flow director means comprises at least one pressure area flapper vane, and further comprising: at least one fourth opening terminating said fourth air flow passage means in the pressure area; at least one fifth opening terminating said fifth air flow passage means in the pressure area; second movement means responsive to said control means for moving said pressure area flapper vanes between a first position and a second position corresponding to said first and second conditions of said control means respectively; and said pressure area flapper vanes in said first position closing said fifth openings and in said second position closing said fourth openings.

33. Apparatus according to claim 31 wherein said housing is comprised of at least one exterior wall and said dividing means are dividing walls internal to said housing.

34. Apparatus according to claim 33 wherein said suction area and said outlet are separated by a second dividing wall and said third openings are holes through said second dividing wall.

35. Apparatus according to claim 34 wherein said suction area is bounded by at least one exterior wall of said housing and said second openings are holes through said exterior wall.

36. Apparatus according to claim 35 wherein said second and third openings are each single holes positioned adjacent in said suction area; said first movement means includes a first rotable shaft; said suction area flapper vanes are a single planar vane positioned between said openings, one end of said vane attaching to said first rotable shaft; said first position is a first arcuate position of said first rotable shaft; and said second position is a second arcuate position of said first rotable shaft.

37. Apparatus according to claim 36 wherein the control means includes first shaft rotating means for rotating said first rotable shaft between said first and second positions.

38. Apparatus according to claim 37 wherein said second dividing wall between the suction area and said outlet intersects with and is perpendicuar to said exterior wall and said first rotable shaft is positioned adjacent the intersection of said walls.

39. Apparatus according to claim 36 wherein said pressure area and said outlet are separated by a third dividing wall and said fourth openings are holes through said third dividing wall.

40. Apparatus according to claim 39 wherein said pressure area is bounded by at least one exterior wall of said housing and said fifth openings are holes through said exterior wall.

41. Apparatus according to claim 40 wherein said fourth and fifth openings are each single holes positioned adjacent in said pressure area; said second movement means includes a second rotable shaft; said pressure area flapper vanes are a single planar vane, one end of said vane attaching to said second rotable shaft; said first position is a first arcuate position of said second rotable shaft; and said second position is a second arcuate position of said second rotable shaft.

42. Apparatus according to claim 41 wherein the angle between said respective first and second arcuate positions of said first and second rotable shafts are equal and said first and second shaft rotating means comprise a control linkage connecting said shafts and enabling movement of the pressure area flapper vane and suction area flapper vane in tandem between their respective first and second arcuate positions.

43. Apparatus according to claim 42 wherein said first and second rotable shafts extend through at least one exterior wall of said housing and said control linkage is mounted external to said housing.

44. The apparatus according to claim 43 wherein the pressure producing means comprises a blower and pressure air passage means connecting a pressure port of said blower and said pressure area.

45. The apparatus according to claim 43 wherein the suction producing means comprises a blower and suction air passage means connecting a suction port of said blower and said suction area.

46. The apparatus according to claim 44 wherein the suction producing means comprises a blower and suction air passage means connecting a suction port of said blower and said suction area.

47. The apparatus according to claim 46 wherein said suction air passage means and said pressure air passage means are a single first air passage, said blower located in said air passage.

48. The apparatus according to claim 47 wherein said blower and said first air passage are located internal to said housing.

49. Apparatus according to claim 30 wherein said second air flow director means comprises at least one pressure area flapper vane, and further comprising: at least one fourth opening terminating said fourth air flow passage means in the pressure area; at least one fifth opening terminating said fifth air flow passage means in the pressure area; and second movement means responsive to said control means for moving said pressure area flapper vanes between a first position and a second position corresponding to said first and second conditions of said control means respectively; said pressure area flapper vanes in said first position closing said fifth openings and in said second position closing said fourth openings.

50. Apparatus according to claim 49 wherein said housing is comprised of at least one exterior wall and said dividing means are dividing walls internal to said housing.

51. Apparatus according to claim 50 wherein said pressure area and said outlet are separated by a third dividing wall and said fourth openings are holes through said third dividing wall.

52. Apparatus according to claim 51 wherein said pressure area is bounded by at least one exterior wall of said housing and said fifth openings are holes through said exterior wall.

53. Apparatus according to claim 52 wherein said fourth and fifth openings are each single holes positioned adjacent in said pressure area; said second movement means includes a second rotable shaft said pressure area flapper vanes are a single planar vane, one end of said vane attaching to said second rotable shaft; said first position is a first arcuate position of said second rotable shaft, and said second position is a second arcuate position of said second rotable shaft.

54. Apparatus according to claim 53 wherein the control means includes second shaft rotating means for rotating said second rotable shaft between said first and second positions.

55. Apparatus according to claim 54 wherein said third dividing wall between said pressure area and said outlet intersects with and is perpendicular to said exterior wall and said second rotable shaft is positioned adjacent the intersection of said walls.

* * * * *